(12) United States Patent
Gowda et al.

(10) Patent No.: US 7,415,356 B1
(45) Date of Patent: Aug. 19, 2008

(54) TECHNIQUES FOR ACCURATELY SYNCHRONIZING PORTIONS OF AN AERIAL IMAGE WITH COMPOSITED VISUAL INFORMATION

(75) Inventors: Sunil Gowda, Redmond, WA (US); Bryan Byrne, Seattle, WA (US); Andy Wand, Newcastle, WA (US)

(73) Assignee: Zillow, Inc., Seattle, WA (US)

( * ) Notice: Subject to any disclaimer, the term of this patent is extended or adjusted under 35 U.S.C. 154(b) by 174 days.

(21) Appl. No.: 11/347,798

(22) Filed: Feb. 3, 2006

(51) Int. Cl.
*G01V 3/38* (2006.01)
*G01S 5/02* (2006.01)
(52) U.S. Cl. ........................... 702/5; 342/357.12
(58) Field of Classification Search ............... 702/1–6; 342/357.12
See application file for complete search history.

(56) References Cited

U.S. PATENT DOCUMENTS

| | | | |
|---|---|---|---|
| 5,614,913 A * | 3/1997 | Nichols et al. | 342/357.12 |
| 6,088,140 A * | 7/2000 | Klug et al. | 359/23 |
| 6,246,415 B1 * | 6/2001 | Grossman et al. | 345/422 |
| 6,366,851 B1 * | 4/2002 | Chojnacki et al. | 701/208 |
| 6,370,483 B1 * | 4/2002 | Beckwith | 702/65 |
| 6,421,610 B1 * | 7/2002 | Carroll et al. | 702/5 |

OTHER PUBLICATIONS

"Windows Live Local," Powered by Virtual Earth, http://local.live.com/?v=28sp=aN.47.621836_-122.

349066_Space%20Needle_example, Internet accessed Mar. 31, 2006, 1 page.
"Windows Live Local," Virtual Earth Technology Preview, http://preview.local.live.com/, Internet accessed Mar. 31, 2006, 1 page.
"My Favorite Place On Earth-Graffiti the world!" http://myfavoriteplaceonearth.com/#, Internet accessed on Jan. 18, 2007, 1 page.
Arrington, M., "New Yahoo Maps Shows Power of Flash," http://www.techcrunch.com/2005/11/02/new-yahoo-maps-shows-power-of-flash/, Nov. 2, 2005, 14 pages.

* cited by examiner

*Primary Examiner*—John Barlow
*Assistant Examiner*—Victor J. Taylor
(74) *Attorney, Agent, or Firm*—Perkins Coie LLP

(57) ABSTRACT

A facility for producing a composite aerial image is described. The facility receives information specifying a geographic area. The facility obtains an aerial image showing the specified geographic area that was prepared using one or more aerial image sections. Each aerial image section covers a geographic area defined in terms of spherical coordinates, and was constructed by copying a portion of a master aerial image that was selected using rectangular coordinates into the master image that were determined by directly transforming the spherical coordinates defining the covered geographic area. The facility obtains information indexed to one or more distinguished geographic locations within the specified geographic area and, for each distinguished geographic location, composites into the obtained aerial image a visual indication of the information that is indexed to the distinguished geographic location.

31 Claims, 7 Drawing Sheets

FIG. 1  *Prior Art*

TECHNIQUES FOR ACCURATELY SYNCHRONIZING PORTIONS OF AN AERIAL IMAGE WITH COMPOSITED VISUAL INFORMATION

TECHNICAL FIELD

The described technology is directed to the field of image-viewing applications.

BACKGROUND

It has become common to dynamically display aerial images, such as aerial photographs, in response to user interactions. For example, a user visiting an aerial imaging web site may type a postal address in order to display an aerial image centered on that address at a medium level of magnification. The user may perform additional interactions to zoom in or out, or to pan in various compass directions. In some cases, the displayed image is overlaid or otherwise composited with various additional features, including roads, political boundaries, geographic names, or real property parcels.

Such dynamic display of aerial images is typically performed using image data captured and processed as follows. First, a number of photographs are taken of the relevant geographic region from an aerial platform, such as an airplane or a satellite. Each photograph is tagged with polar or other spherical coordinates—e.g., latitude-longitude pairs—identifying the area shown. The photographs are then concatenated together on the surface of a 3-dimensional solid representing the Earth, such as a sphere or a spheroid. Because the images are generally ultimately displayed on a flat surface, the coordinates with which it is indexed on the surface of a 3-dimensional solid must be transformed into coordinates in a single plane before being incorporated in a displayed image. This transformation is commonly accomplished by (1) performing a cylindrical projection in which points on the surface of the sphere or spheroid representing the Earth are projected onto the lateral surface of a cylinder whose central axis coincides with a polar axis of the sphere or spheroid that corresponds to the Earth's polar axis and that intersects the sphere or spheroid at the equator (i.e., a cylindrical projection in which the standard parallel is the equator), (2) then unrolling the lateral surface of the cylinder to produce a plane, sometimes called a "master image." This master image is then divided into a 2-dimensional array of rectangular portions, called "tiles." When a dynamic aerial image request is received for a particular location and magnification level, one or more tiles about the location are retrieved, joined, and trimmed in a manner that satisfies the request, and returned.

Unfortunately, the conventional approach described above has important disadvantages. First, it tends to distort the horizontal scale of tiles near extreme latitudes of the covered region, i.e., portions of the region nearest a pole. FIG. 1 is a map diagram showing the distortion effect suffered by conventional approaches at extreme latitudes. Tiles 110, 120, 130, 140, and 150 are tiles from the Northern hemisphere that progress in a direction from South to North. The width of these tiles is constant in terms of longitude. For example, each tile may have a longitudinal width of 0.01° longitude. However, as the tiles move closer to the pole, that is, as they move North, their width in distance declines. For example, it can be seen that the width 123 in distance at the top of tile 120 is smaller than the corresponding width 113 at the top of tile 110. Indeed, when tile 150 is reached, the width in distance is substantially reduced to width 153. In performing the cylindrical projection using the equator as the standard parallel, the conventional approach has the effect of expanding the width of the image for each tile to a degree that increases with proximity to a pole. For example, it can be seen that the width of the image for tile 150 is increased dramatically from width 153 to width 156, a horizontal magnification of about 200% relative to images at the standard parallel latitude. As a result, a visual feature shown in tile 140 would appear twice as wide (but no taller) than a feature of the same size shown in tile 110. This distortion effect can significantly impair the recognizability of aerial imagery, and the ability to form accurate spatial perceptions from it.

The conventional approach also has the disadvantage that it tends to magnify conversion errors from latitude/longitude coordinates commonly used to refer to locations into planar coordinates in the master image. FIG. 2 is a map diagram showing the location and accuracy disadvantage suffered by the conventional approaches. The diagram shows a master image 200 that has been divided into tiles using the conventional approach, beginning from an origin of 122.00° West, 47.50° North. The tiles are each intended to represent an area 0.01° wide and 0.01° tall. The conventional approach proceeds by converting this spherical width and height into distance. In particular, it converts the 0.01° width to 0.4665 miles, and the 0.01° height to 0.690 miles. It moves to the right by this width distance and down by this height distance from the origin to define the first tile 210. It moves to the right by the width distance again to define the tile 230 immediately to the East, and down again by the height distance to define the tile 240 immediately to the South, proceeding this way until the master image has been completely divided into tiles. The borders between adjacent tiles defined in this manner are shown in the diagram by broken lines. For example, tile 210 begins at the origin and is bordered by the first broken line segments to the right and down, respectively. It is typical for a certain amount of error to be present in the converted distances, introduced by errors in measurement, errors in calculation, and/or rounding error. While the inaccuracy of area covered by tiles resulting from this error can be small near the origin—as reflected by the relatively small difference between tile 210 and corresponding intended tile area 260, this inaccuracy worsens at greater distances from the origin. For example, it can be seen that tile 220 is significantly dislocated from its intended tile area 270, to such an extent that a displayed aerial image that relied upon tile 220 would not contain the correct information, would show visual features of the image in the wrong positions, and would accordingly poorly coordinate the positions of the visual features of the aerial images with composited external visual information. As an example, a house visual feature 272 is included in the master image at the position shown. While its position places it in the center of intended tile area 270, it is actually included at the lower left hand corner of corresponding tile 220. The house that is the subject of this visual feature is at the center of a real estate parcel 271. Because the conventional approach believes that the tile 220 corresponds to the area of intended tile area 270, however, it will composite the parcel boundary visual information 221—i.e., the outline of the parcel—in the center of tile 220. Rather than surrounding the house visual feature as it should, the displayed parcel boundary excludes the house. This is not helpful to a user who wishes to understand how buildings are situated on a parcel, how the parcel is situated relative to visual features of the surrounding neighborhood, etc.

Accordingly, a process for generating dynamic aerial images that provide optimized aerial image portions for accurate compositing with other visual information would have significant utility.

DETAILED DESCRIPTION

Figure 1:
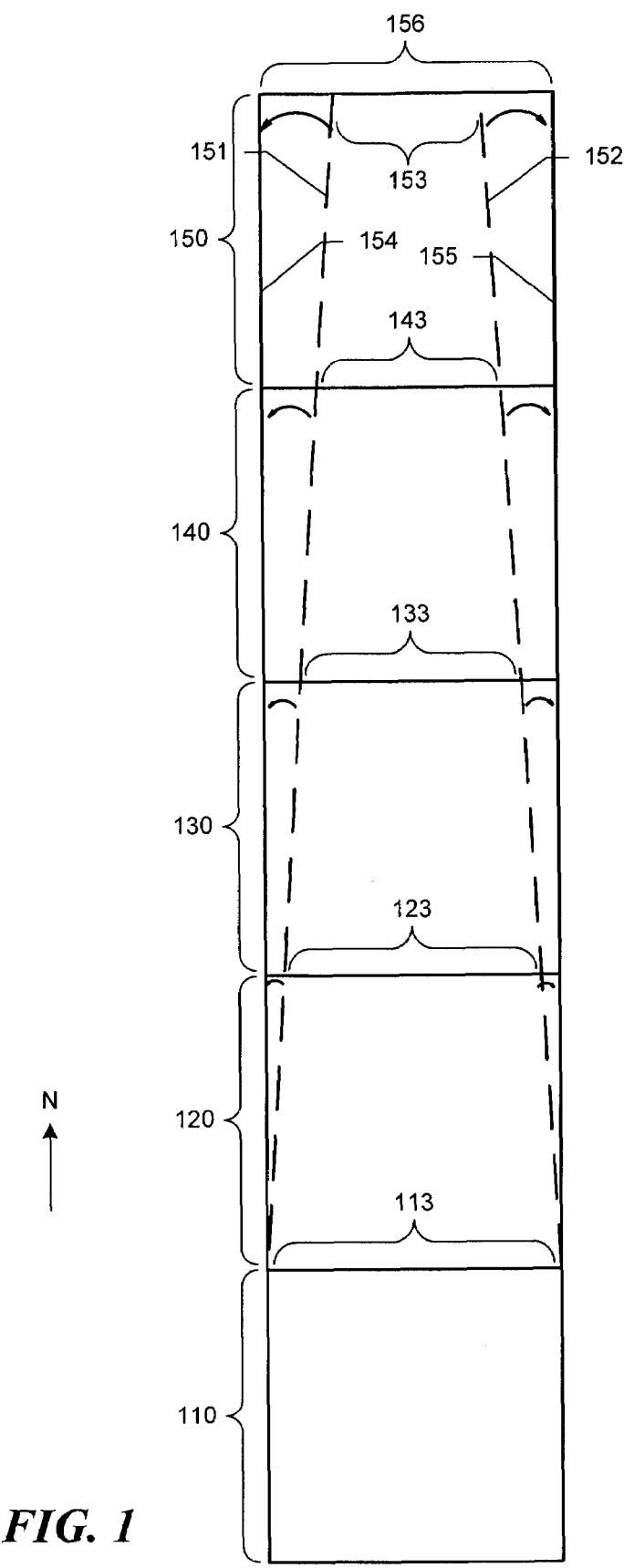
FIG. 1 is a map diagram showing the distortion effect suffered by conventional approaches at extreme latitudes.
Figure 2:
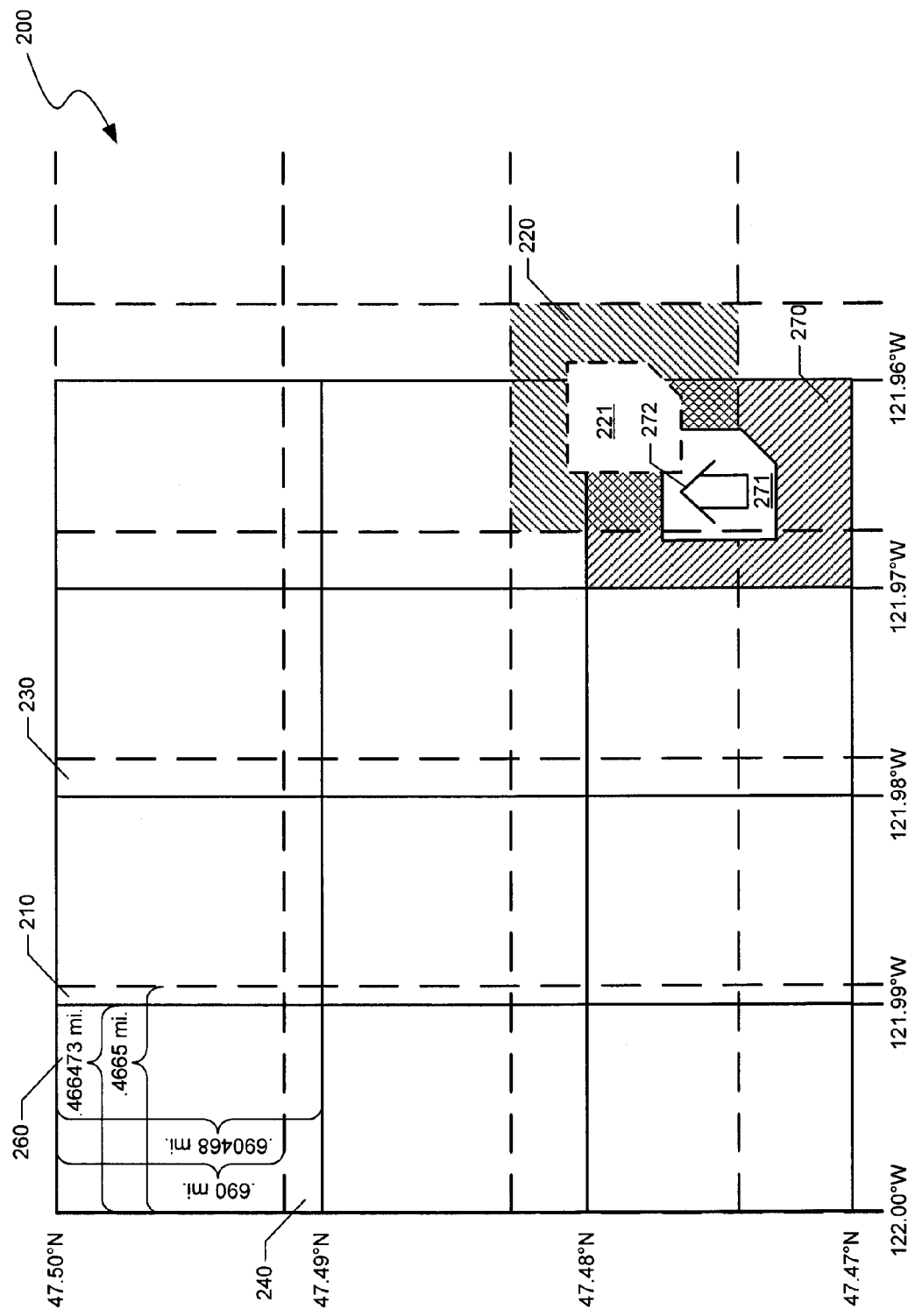
FIG. 2 is a map diagram showing the location and accuracy disadvantage suffered by the conventional approaches.

A software facility is described that provides optimized aerial image portions for accurate compositing with other visual information, such as real property boundaries. The facility concatenates a number of source aerial images into a master image covering a large region, then produces a number of sections of the master image each covering a portion of the region covered by the master image. In response to a request to generate a display in which a specified subregion of the master image is composited with specified other visual information, the facility identifies sections containing portions of the subregion, joins and trims these sections as necessary to cover the subregion, and composites the specified visual information with the resulting image.

Because the source aerial images are typically concatenated to occupy the non-developable surface of a three-dimensional solid representing the shape of the Earth—such as a sphere or a spheroid—that is indexed using spherical coordinates, such as latitude and longitude or other polar coordinates, this surface is conventionally projected onto a developable surface such as a cylinder, then unrolled to obtain a planar master image. The described projection is conventionally performed using the Earth's equator as the standard parallel. That is, for the projection, the cylinder or other developable shape intersects the sphere or spheroid representing the Earth only at the equator. In some embodiments, the facility selects a standard parallel other than the equator that is near a point mid-latitude in the covered region, such as 37° North latitude for a covered region corresponding to the United States. By doing so, the facility minimizes the distortion affecting sections from extreme latitudes, such as Northern latitudes in the United States.

In some embodiments, the facility selects each section from the master image individually. Rather than simply dividing the master image into fully covering, mutually exclusive tiles all having a fixed height and width determined by once converting spherical dimensions into planar dimensions, the facility begins from a number of bounding shapes defined by vertices expressed in spherical coordinates. For each section, the facility independently converts the spherical coordinates for each vertex of the bounding shape to planar coordinates, and selects for the section the portion of the master image falling within these converted coordinates. By doing so, the facility avoids compounding errors incurred in converting the coordinates, causing the sections to more accurately correspond to the spherical coordinates to which they are expected to correspond. As a result, when additional visual information such as real property parcel boundaries whose location is defined using spherical coordinates such as latitude/longitude is composited with the aerial image formed from the sections, the visual information will be more accurately spatially synchronized with the contents of the image.

Figure 3:
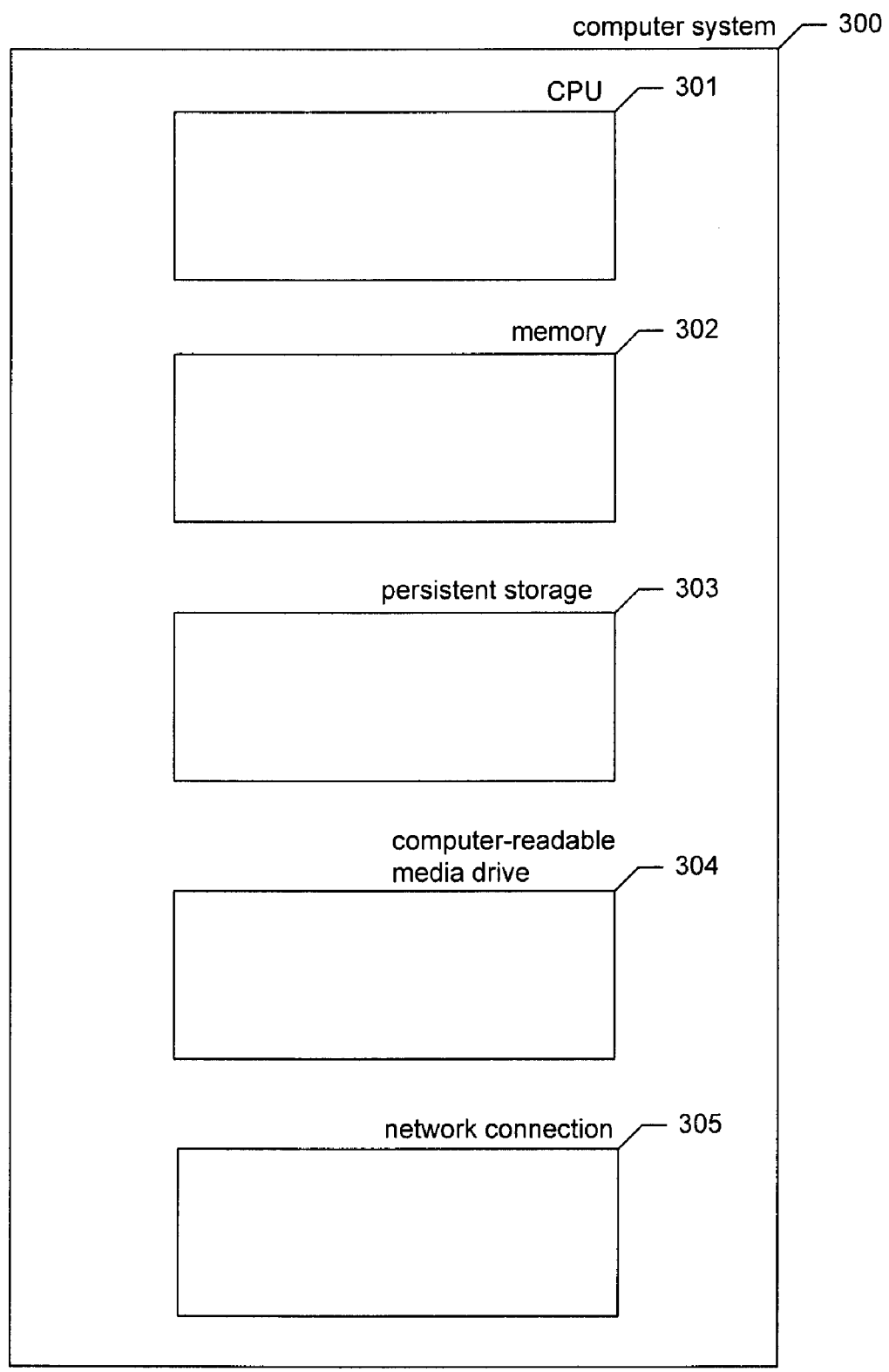
FIG. 3 is a block diagram showing some of the components typically incorporated in at least some of the computer systems and other devices on which the facility executes.

FIG. 3 is a block diagram showing some of the components typically incorporated in at least some of the computer systems and other devices on which the facility executes. These computer systems and devices 300 may include one or more central processing units ("CPUs") 301 for executing computer programs; a computer memory 302 for storing programs and data—including data structures, database tables, other data tables, etc.—while they are being used; a persistent storage device 303, such as a hard drive, for persistently storing programs and data; a computer-readable media drive 304, such as a CD-ROM drive, for reading programs and data stored on a computer-readable medium; and a network connection 305 for connecting the computer system to other computer systems, such as via the Internet, to exchange programs and/or data—including data structures. In various embodiments, the facility can be accessed by any suitable user interface including Web services calls to suitable APIs. While computer systems configured as described above are typically used to support the operation of the facility, one of ordinary skill in the art will appreciate that the facility may be implemented using devices of various types and configurations, and having various components.

Figure 4A:
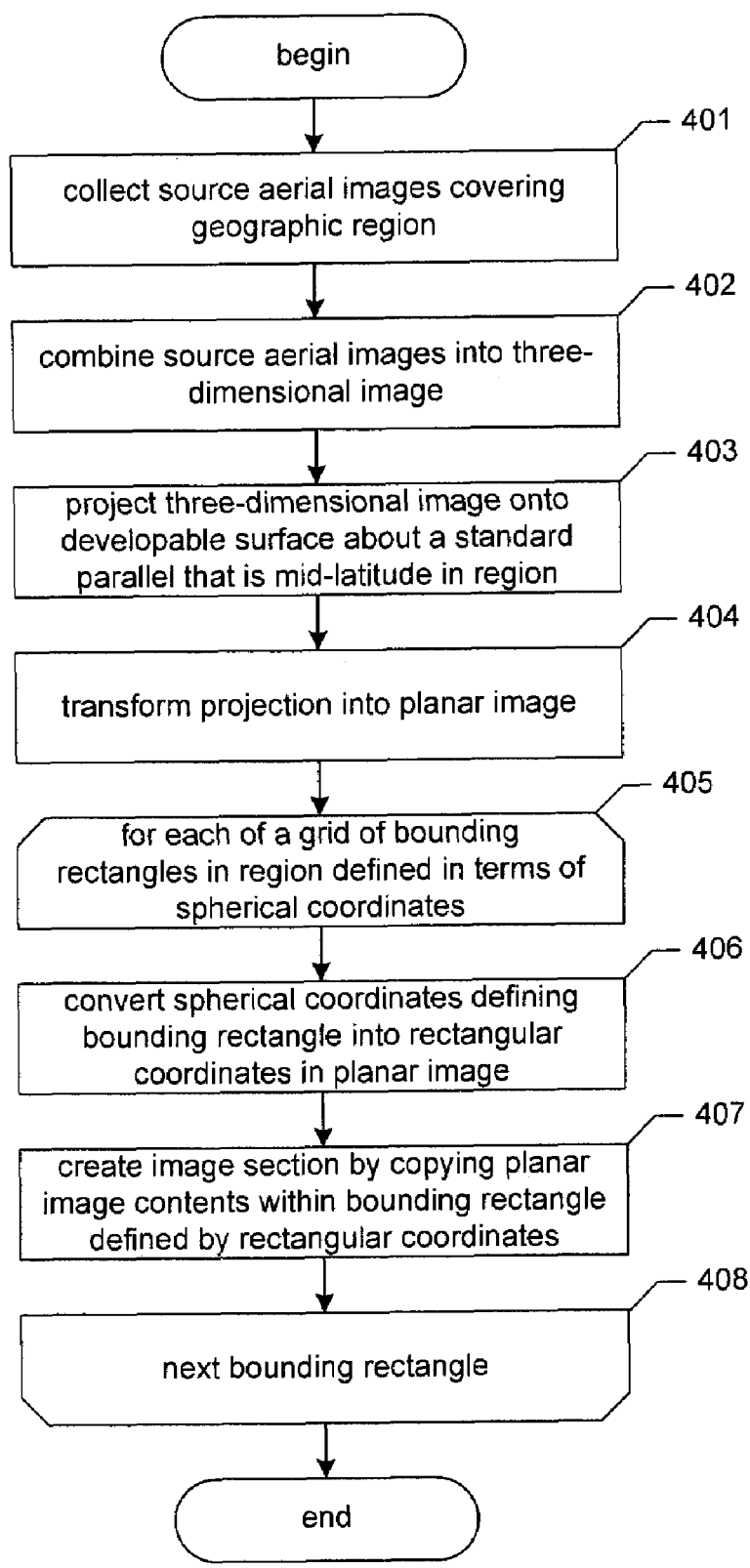
FIG. 4A is a flow diagram showing steps typically performed by the facility in order to construct a library of aerial image sections for a particular geographic region.
Figure 4B:
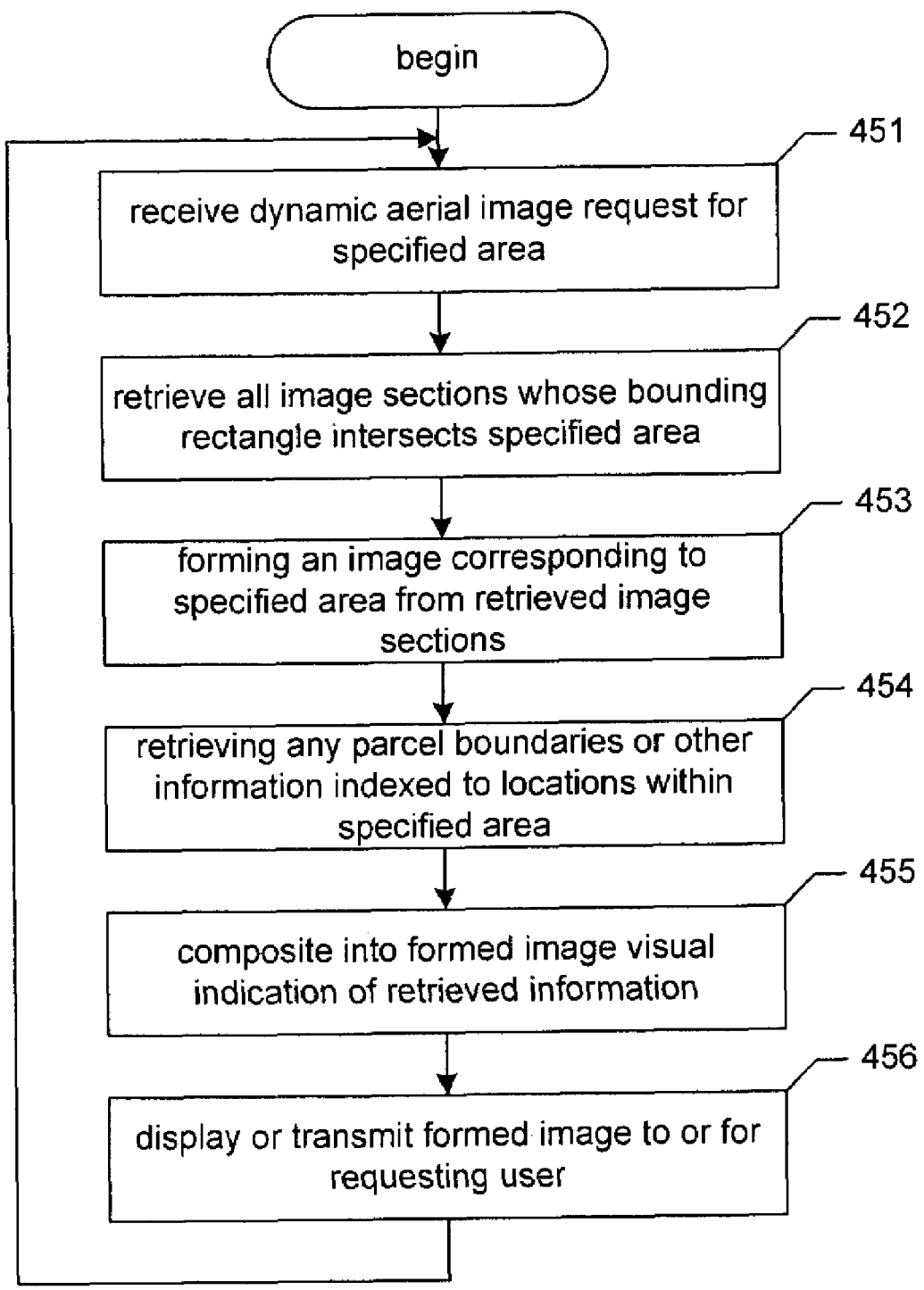
FIG. 4B is a flow diagram showing steps typically performed by the facility to process dynamic aerial image requests received for particular areas within the geographic area of the aerial image section library generated by the facility.

FIGS. 4A and 4B are flow diagrams describing the operation of the facility. FIG. 4A is a flow diagram showing steps typically performed by the facility in order to construct a library of aerial image sections for a particular geographic region. In step 401, the facility collects source aerial images covering the geographic region. These aerial images may be captured in a variety of ways, such as taking photographs from an aerial platform such as an airplane, helicopter, dirigible, or satellite. In step 402, the facility combines the source aerial images into a three-dimensional image whose shape models the shape of the earth, such as the surface of a sphere or spheroid. In some cases, the combination performed in step 402 coordinates the position of adjacent source aerial images by such techniques as matching visual features occurring in adjacent images, and/or comparing spherical coordinates—such as latitude/longitude positions retrieved from a GPS receiver in the photography platform—that are tagged to each image. Further, the facility may employ a variety of techniques to combine the content of overlapping portions of the source aerial images, such as including the content from only one of the overlapping images, or compositing together the content from two or more overlapping images.

In step 403, the facility projects the three-dimensional image performed in step 402 onto a developable surface, such as the lateral surface of a cylinder or a cone. The facility performs the projection about a standard parallel that is approximately mid-latitude in the region. For example, where the region is the continental United States, the facility typically uses a standard parallel of 370 North latitude. In some embodiments, the facility uses a wider range of latitudes falling within the region. In step 404, the facility transforms the projection into a planar image by "unrolling" the developable surface onto which the three-dimensional image was projected.

A wide variety of available techniques for performing the acts described above are known to those of skill in the art. Some such techniques are described in the following references, each of which is hereby incorporated by reference in its entirety: Bugayevskiy, L. M., Map Projections; A Reference Manual (1995); Iliffe, Jonathan C., Datums and Map Projections (2000); and Yang, Qihe, Map Projection Transformations; Principles and Applications (1999).

In steps 405-408, the facility loops through each of a grid or other array of bounding rectangles or other polygons in the region, each of which is defined in terms of spherical coordinates. For example, bounding rectangles may be defined by latitude/longitude pairs for each of two opposite corners of the rectangle. In step 406, the facility converts the spherical coordinates defining the current bounding rectangle into rectangular coordinates into the planar image created in step 404. Such conversion is typically direct to minimize the incurred level of error. In step 407, the facility creates an image section for the current bounding rectangle by copying the contents of the planar image that are within the rectangle defined by the rectangular coordinates obtained in step 406. In step 408, if additional bounding rectangles remain to be processed, the facility continues in step 408 to process the next bounding rectangle. After step 408, these steps conclude.

Those skilled in the art will appreciate that the steps shown in FIG. 4A and in each of the flow diagrams discussed below may be altered in a variety of ways. For example, the order of the steps may be rearranged; substeps may be performed in parallel; shown steps may be omitted, or other steps may be included; etc.

FIG. 4B is a flow diagram showing steps typically performed by the facility to process dynamic aerial image requests received for particular areas within the geographic area of the aerial image section library constructed by the facility. In step 451, the facility receives a dynamic aerial image request that specifies a particular geographic area using one or more spherical coordinates. For example, the request may specify a latitude/longitude pair for the Northwestern corner of the specified area, and another for the Southeastern corner, or may specify a latitude/longitude pair for the center of the specified area together with a width and/or height expressed either as a distance or an angle or together with a magnification factor. In some embodiments, the received dynamic aerial image request specifies a particular geographic area using a different approach, such as specifying a row and column in a rectangular grid at a particular zoom level. In some embodiments, the requests are received from or on behalf of a user who is interacting with a real estate information web site or other aerial visualization web site.

In step 452, the facility retrieves every image section in the library whose bounding rectangle intersects the area specified by the request. Such intersection is typically judged by comparing spherical coordinates defining the specified area to spherical coordinates defining each of the image sections' bounding rectangles. In some embodiments, the retrieved image sections are accompanied by or contain information usable to determine which geographic areas they cover and how they are to be arranged for joining together.

In step 453, the facility forms an image corresponding to the specified area from the image sections retrieved in step 452. For some requests, this involves joining together two or more adjacent image sections. For some requests, this involves trimming or pruning portions of the retrieved image sections that are outside the specified area. In various embodiments, the image formation of step 455 is performed on a server on which some of the involved data is stored, a separate image formation server, or the user's computer system.

In step 454, the facility accesses a database of location-indexed information. In the database, information items are typically indexed to a geographic location using latitude/longitude pairs or other spherical coordinates. In some embodiments, the information items included in the database include real estate parcel boundaries, as well as a variety of other information that relates to specific geographic locations. In some embodiments, the database is, or is populated from, a database operated by a local government acting as a taxing and/or title registration authority. The facility retrieves from the database any parcel boundaries or other information indexed to locations within the specified area.

In step 455, the facility composites into the image formed in step 453 one or more visual indications of the information retrieved in step 454. These visual indications are placed into the formed image in positions corresponding to the locations to which they are indexed. A real estate parcel boundary is typically portrayed by a visual indication comprising a series of line segments collectively surrounding the parcel. In various embodiments, the compositing of step 455 is performed on a server on which some of the involved data is stored, a separate compositing server, or the user's computer system.

In step 456, the facility displays or transmits the resulting image to or for the requesting user. For example, the facility may display the image to the user on a display device, such as a computer monitor, a wireless phone display, or a portable or vehicle-mounted GPS receiver or other navigation device. The facility may also transmit the image to any of a variety of computers or other devices capable of displaying the image to the user, or intermediate computer systems or other devices where the image may be stored before being displayed to the user.

After step 456, the facility continues in step 451 to receive the next request.

Figure 5:
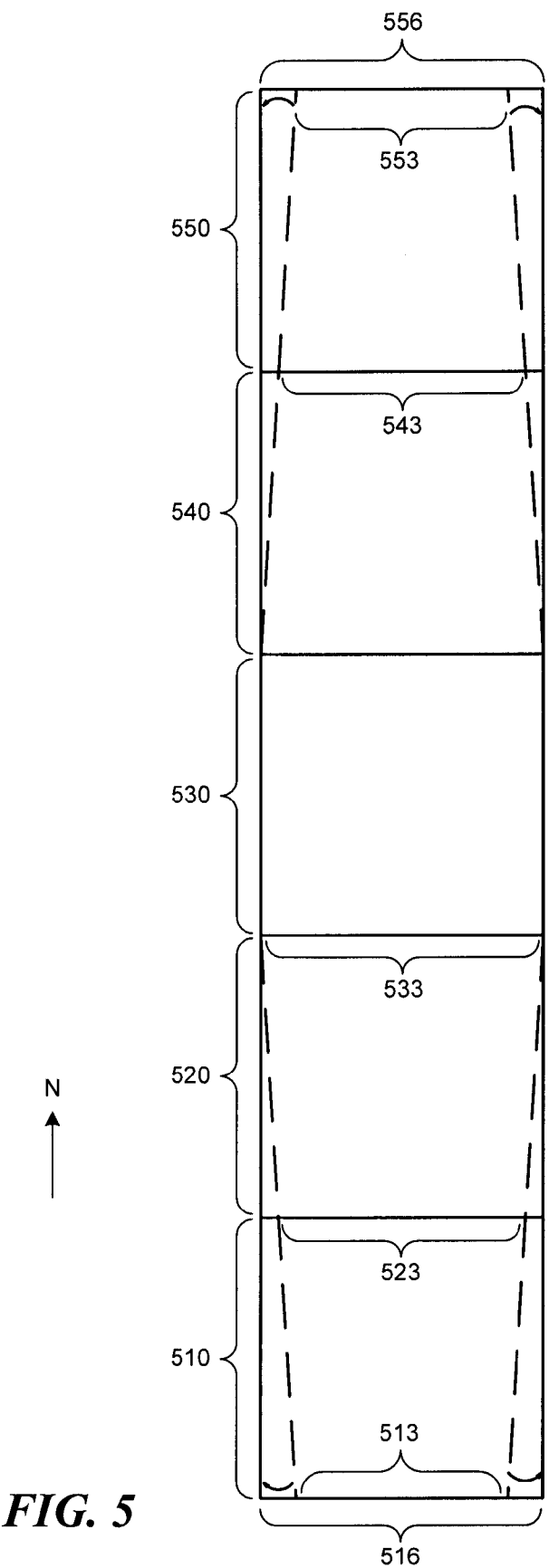
FIG. 5 is a map diagram illustrating a reduction in horizontal distortion provided by the facility.
Figure 6:
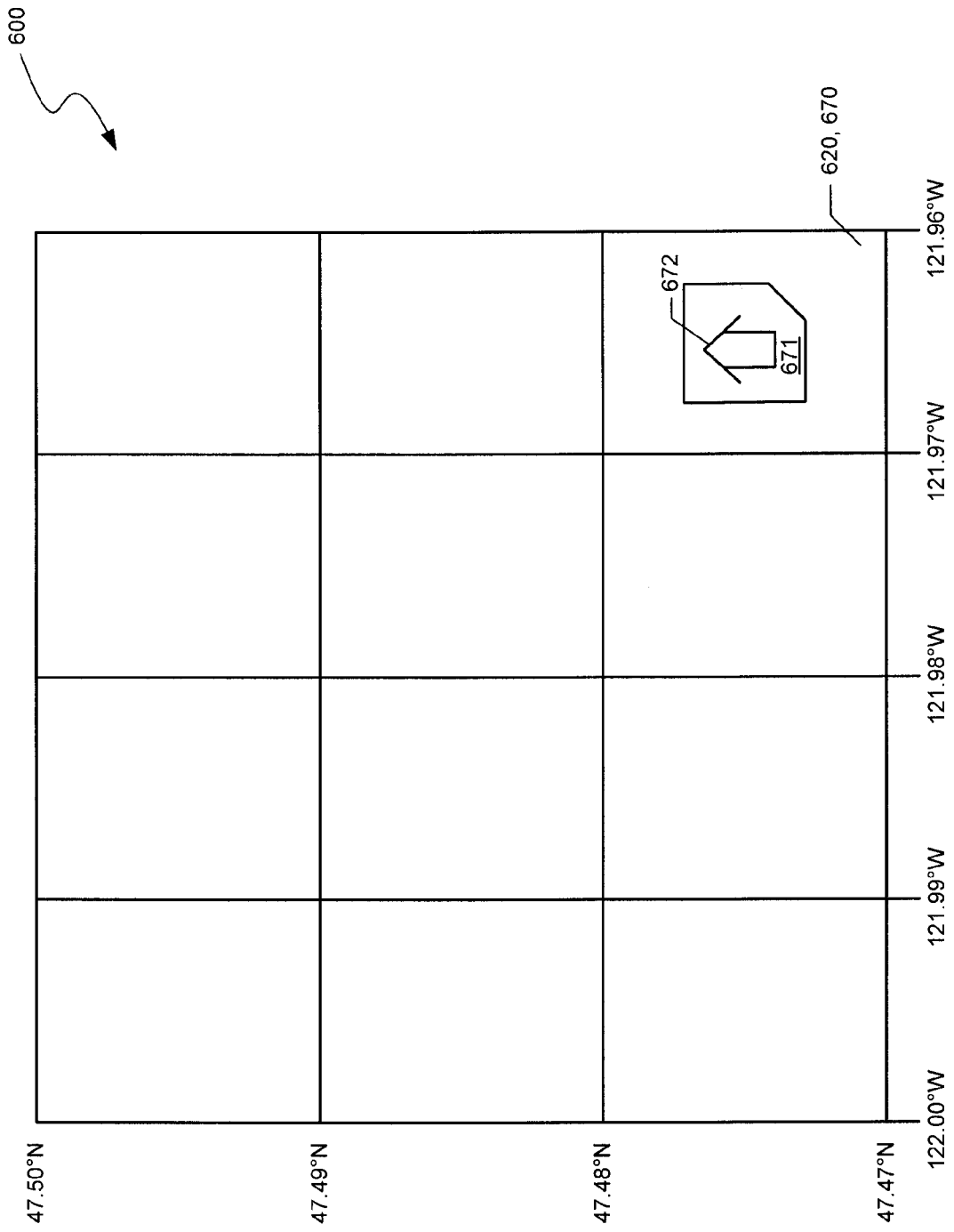
FIG. 6 is a map diagram illustrating the high degree of coordination between aerial imagery and composited external visual information provided by the facility.

FIGS. 5 and 6 show beneficial effects typically obtained by operating the facility. FIG. 5 is a map diagram illustrating a reduction in horizontal distortion provided by the facility. By using a mid-latitude standard parallel for its projection, the facility has relocated the area of least horizontal distortion from portion 110 shown in FIG. 1, having the least extreme latitude, to portion 530 shown in FIG. 5, having a latitude near the center of the region. Correspondingly, some horizontal distortion now occurs at both the Northern-most and (portion 550) in the Southern-most end (portion 510). However, the degree of distortion at each end is less significant than the distortion depicted in FIG. 1 for the most extreme latitude (portion 150).

FIG. 6 is a map diagram illustrating the high degree of coordination between aerial imagery and composited external visual information provided by the facility. It can be seen that, because the image sections of the image library 600 correspond more closely to their intended geographic areas (as image section 620 corresponds to its intended geographic area 670), visual features, such as house 672, occur in the expected section, as well as the expected relative position in that section. Accordingly, when external information—such as parcel boundary 671—is composited with images formed from the sections, this external visual information is better spatially coordinated with the visual features of the aerial imagery.

It will be appreciated by those skilled in the art that the above-described facility may be straightforwardly adapted or extended in various ways. For example, the facility may be used in connection with a variety of different geographic regions of various sizes and in various locations on the Earth, other planets or celestial bodies, or other three-dimensional objects. The facility may use source images captured and location-indexed using a variety of different techniques, and that overlap to varying degrees. The facility may produce a variety of types of result images, and convey them to users in a variety of ways. While the foregoing description makes reference to particular embodiments, the scope of the invention is defined solely by the claims that follow and the elements recited therein.

We claim:

1. A method in a computing system for presenting an aerial image, comprising:
    collecting a plurality of source aerial images each covering a particular geographic region;
    combining the source aerial images into a three-dimensional image that is directly accessible via spherical coordinates and covers a union of the geographic regions covered by the source aerial images;
    projecting the three-dimensional image about a standard parallel of approximately 37° North latitude onto a developable surface;
    transforming the projection into a planar image;
    for each of a grid of bounding rectangles within the geographic region covered by the three-dimensional image, the projection, and the planar image, each bounding rectangle being defined in terms of polar coordinates:
        converting each set of polar coordinates defining the bounding rectangle into rectangular coordinates in the planar image, and
        creating an image section by copying the contents of the planar image contained by the bounding rectangle defined by the rectangular coordinates;
    receiving display requests each specifying a bounded area using at least one set of spherical coordinates; and
    for each received display request:
        retrieving any image section whose bounding rectangle intersects the specified bounding area,
        forming an image result corresponding to the specified bounded area from the retrieved image sections, and
        presenting the image result to a user.

2. The method of claim 1 wherein the compositing is performed by superimposing the external visual information over the image result.

3. The method of claim 1 wherein each display request specifies a bounded area using a pair of reference points expressed in spherical coordinates and a magnification level that are at non-adjacent vertices of a polygon bounding the bounded area.

4. The method of claim 1 wherein each display request specifies a bounded area using a combination of a single reference point expressed in spherical coordinates and a magnification level.

5. The method of claim 1, further comprising, before presenting the image result to a user, compositing the image result with external visual information associated with a point within the specified bounded area.

6. The method of claim 5 wherein the compositing is performed on a server computer system.

7. The method of claim 5 wherein the compositing is performed on a user computer system.

8. A method in a computing system for producing a planar aerial image, comprising:
    collecting a plurality of source aerial images each covering a particular geographic region;
    combining the source aerial images into a three-dimensional image that is directly accessible via spherical coordinates and covers a union of the geographic regions covered by the source aerial images;
    projecting the three-dimensional image about a standard parallel other than the equator onto a developable surface; and
    transforming the projection into a planar image.

9. The method of claim 8 wherein the standard parallel about which the three-dimensional image is projected is within the geographic region covered by the three-dimensional image.

10. The method of claim 8 wherein the standard parallel about which the three-dimensional image is projected is approximately mid-latitude in the geographic region covered by the three-dimensional image.

11. The method of claim 8 wherein the three-dimensional image formed by combining the source aerial images is spherical in shape.

12. The method of claim 8 wherein the three-dimensional image formed by combining the source aerial images is spheroidical in shape.

13. The method of claim 8 wherein the developable shape onto which the three-dimensional image is projected is a cylinder.

14. The method of claim 8 wherein the developable shape onto which the three-dimensional image is projected is a cone.

15. A computing system for producing a planar aerial image, comprising:
    a memory containing a plurality of source aerial images each covering a particular geographic region;
    a source aerial image combination subsystem that combines the source aerial images contained by the memory into a three-dimensional image that is directly accessible via spherical coordinates and covers a union of the geographic regions covered by the source aerial images;
    a projection subsystem that projects the three-dimensional image produced by the source aerial image combination subsystem about a standard parallel other than the equator onto a developable surface; and
    a transformation subsystem that transforms the projection produced by the projection subsystem into a planar image.

16. The computing system of claim 15, further comprising a display device that displays at least a portion of the planar image.

17. The computing system of claim 15, further comprising a communication device that communicates at least a portion of the planar image to a separate computing system.

18. One or more computer memories collectively containing an aerial imagery library data structure, the data structure comprising:
    a plurality of aerial image sections, each aerial image section covering a geographic area defined in terms of spherical coordinates and having been constructed by copying a portion of a master aerial image, the portion having been selected using rectangular coordinates into the master image determined by directly transforming the spherical coordinates defining the covered geographic area; and
    for each aerial image section of the plurality, information indicating spherical coordinates defining the geographic area covered by the aerial image section, such that the contents of the data structure may be used to respond to dynamic aerial imagery requests.

19. The computer memories of claim 18 wherein the data structure further comprises conversion information usable to determine, for a geographic location expressed in spherical coordinates, a position in an aerial image section covering the geographic location that corresponds the geographic location.

20. The computer memories of claim 18 wherein a portion of the pixels of the master image are each present in a plurality of image sections.

21. The computer memories of claim 18 wherein a portion of the pixels of the master image are not present in any image section.

22. The computer memories of claim 18 wherein not all of the image sections have the same number of pixels.

23. A computer-readable medium whose contents cause a computing system to perform a method for constructing a library of aerial image sections, the method comprising:
  collecting a plurality of source aerial images each covering a particular geographic region;
  combining the source aerial images into a three-dimensional image that is directly accessible via spherical coordinates and covers a union of the geographic regions covered by the source aerial images;
  projecting the three-dimensional image onto a developable surface;
  transforming the projection into a planar image;
  for each of an array of bounding polygons within the geographic region covered by the three-dimensional image, the projection, and the planar image, each bounding polygon being defined in terms of polar coordinates:
    converting each set of polar coordinates defining the bounding polygon into rectangular coordinates in the planar image, and
    creating an image section by copying the contents of the planar image contained by the bounding polygon defined by the rectangular coordinates; and
  storing the created image sections in a library.

24. The computer-readable medium of claim 23, the method further comprising:
  receiving display requests each specifying a bounded area using at least one set of spherical coordinates; and
  for each received display request:
    retrieving any image section whose bounding polygon intersects the specified bounding area,
    forming an image result corresponding to the specified bounded area from the retrieved image sections, and
    presenting the formed image result to a user.

25. The computer-readable medium of claim 24, the method further comprising, for each received display request, before presenting the formed image result to a user, compositing into the image result external visual information associated with a point within the specified bounded area.

26. A method in a computing system for producing a composited aerial image, comprising:
  receiving information specifying a geographic area;
  obtaining an aerial image showing the specified geographic area prepared using one or more aerial image sections, each aerial image section covering a geographic area defined in terms of spherical coordinates and having been constructed by copying a portion of a master aerial image, the portion having been selected using rectangular coordinates into the master image determined by directly transforming the spherical coordinates defining the covered geographic area; and
  obtaining information indexed to one or more distinguished geographic locations within the specified geographic area; and
  for each distinguished geographic location, compositing into the obtained aerial image a visual indication of the information indexed to the distinguished geographic location.

27. The method of claim 26, further comprising preparing the obtained aerial image.

28. The method of claim 26, further comprising constructing the aerial image sections.

29. The method of claim 26 wherein the obtained information is indexed to distinguished geographic locations defined in terms of spherical coordinates.

30. The method of claim 26 wherein the obtained information is indexed to distinguished geographic locations defined in terms of latitude and longitude.

31. The method of claim 26 wherein one visual indication composited into the obtained aerial image is a real property parcel border.

* * * * *

UNITED STATES PATENT AND TRADEMARK OFFICE
CERTIFICATE OF CORRECTION

| | |
|---|---|
| PATENT NO. | : 7,415,356 B1 |
| APPLICATION NO. | : 11/347798 |
| DATED | : August 19, 2008 |
| INVENTOR(S) | : Gowda et al. |

It is certified that error appears in the above-identified patent and that said Letters Patent is hereby corrected as shown below:

In column 4, line 65, delete "370" and insert -- 37° --, therefor.

Signed and Sealed this

Eleventh Day of November, 2008

JON W. DUDAS
*Director of the United States Patent and Trademark Office*